United States Patent [19]

Browning

[11] Patent Number: 4,667,388

[45] Date of Patent: May 26, 1987

[54] INTERNAL COMBUSTION ENGINE VALVE ASSEMBLY MOUNTING TOOL

[76] Inventor: Ernest C. Browning, 2383 Zollinger Rd., Columbus, Ohio 43221

[21] Appl. No.: 752,656

[22] Filed: Jul. 8, 1985

Related U.S. Application Data

[63] Continuation of Ser. No. 525,091, Aug. 22, 1983, abandoned.

[51] Int. Cl.[4] .................................... B23P 19/04
[52] U.S. Cl. ..................................... 29/249; 29/275
[58] Field of Search ............................. 29/213–215, 29/249, 254, 275, 255

[56] References Cited

U.S. PATENT DOCUMENTS

| | | | |
|---|---|---|---|
| 2,434,456 | 1/1948 | Cook | 29/249 X |
| 3,315,339 | 4/1967 | Young | 29/249 |
| 3,564,697 | 2/1971 | Shalaty et al. | 29/249 |
| 4,095,324 | 6/1978 | Lawson | 29/249 |
| 4,103,409 | 8/1978 | Young | 29/249 |

FOREIGN PATENT DOCUMENTS 467820  5/1975  U.S.S.R. ................... 29/214

Primary Examiner—Frederick R. Schmidt
Assistant Examiner—Steven P. Schad
Attorney, Agent, or Firm—Frost & Jacobs

[57] ABSTRACT

A tool for mounting the valve assemblies of an engine block, each valve assembly being of the type comprising a valve with an elongated stem, a compression spring surrounding the valve stem, with one end abutting the engine block and the other end abutting a spring retainer, a segmental keeper engagable in an annular groove in the valve stem and maintaining the spring retainer in position on the valve stem, and an oil sealing ring mounted in an annular groove in the valve stem and sealingly engaging the spring retainer. The tool comprises a body portion having a free end and a working end. An axial bore extends inwardly of the working end and is of such diameter as to just nicely receive the free end of the valve stem. The working end provides a surface surrounding the axial bore and during the valve mounting operation is positioned to abut the segmental keeper when the free end of the valve stem is located within the axial bore such that when an axial blow is administered to the tool, the segmental keeper will shift along the valve stem until it is engaged in its annular groove. The depth of the axial bore is such that the free end of the valve stem will abut the bottom of the bore preventing the tool from shifting the segmental keeper beyond its groove engaging position and into contact with the oil sealing ring, thus preventing damage or destruction to the oil sealing ring.

5 Claims, 6 Drawing Figures

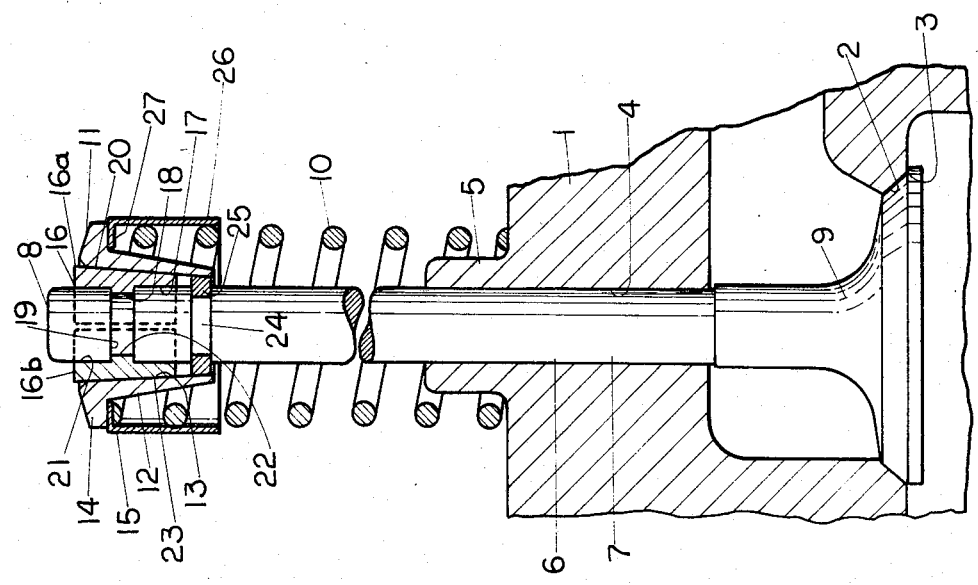
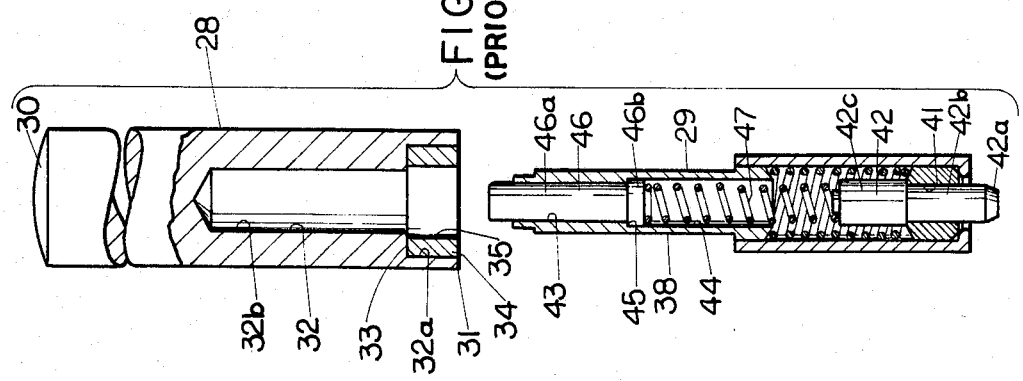
FIG. 2 (PRIOR ART)
FIG. 1

INTERNAL COMBUSTION ENGINE VALVE ASSEMBLY MOUNTING TOOL

This is a continuation, of application Ser. No. 525,091, filed Aug. 22, 1983 (now abandoned).

TECHNICAL FIELD

The invention relates to a tool for mounting a valve assembly of an internal combustion engine, and more particularly to such a tool for use with a valve assembly of the type that has a stem mounted oil sealing ring adapted to sealingly engage the spring retainer of the assembly.

BACKGROUND ART

Overhead internal combustion engines, as used in automobiles, motorcycles, trucks, boats and aircraft, are well known in the art. The valves for such engines are retained in the engine block in association with inlet and outlet ports. Each valve has an elongated stem which extends slidably through a perforation in the engine block and is provided with a strong compression spring surrounding the stem externally of the engine block. One end of the compression spring abuts the engine block, while the other end abuts a spring retainer mounted near the free end of the valve stem. The spring retainer is maintained in place by a segmental keeper and the action of the compression spring.

Heretofore, mounting and demounting of the valve assemblies has been a difficult and time consuming operation requiring the use of a special C-clamp to hold the compression spring in compressed condition for removal and mounting of the segmental keeper.

U.S. Pat. No. 3,315,339 teaches a combination tool comprising a valve demounting tool part and a valve mounting tool part. Through the use of these tool parts, properly located in association with a valve assembly, the valve assembly can be mounted and demounted easily and quickly through the administration of an axial blow to the appropriate tool part. No spring-compressing C-clamp or other cumbersome tool is required. The valve assembly mounting and demounting operations can be accomplished with a minimum of manual effort.

The valve assemblies are provided with oil sealing means which must be intact and in good operating order or the internal combustion engine will "use oil". In some valve assemblies, the oil sealing means is located in conjunction with the engine block and the valve stem. In other valve assemblies, the oil sealing means is located in conjunction with the valve stem and the spring retainer. In the use of the combination tool of U.S. Pat. No. 3,315,339, in association with valve assemblies of the type having an oil sealing means in conjunction with the valve stem and the spring retainer, the segmental keeper can be driven too far along the valve stem, to the point where it contacts and damages or destroys the oil sealing means.

The valve assembly mounting tool of the present invention is so designed as to preclude over-driving of the segmental keeper and consequent damage to or destruction of the oil sealing means. The valve assembly mounting tool of the present invention may constitute a separate tool, or it may be configured as an accessory part of the combination tool of the above noted U.S. Pat. No. 3,315,339. For purposes of an exemplary showing, the tool of the present invention will be described in its application as an accessory part of the tool of U.S. Pat. No. 3,315,339. This is done as a matter of convenience, and is not intended to constitute a limitation of the invention.

DISCLOSURE OF THE INVENTION

According to the invention, there is provided a tool for mounting the valve assemblies of an internal combustion engine block. The tool is particularly adapted to the mounting of valve assemblies of the type comprising a valve with an elongated stem, a compression spring surrounding the valve stem, a spring retainer, a segmental keeper engagable in an annular groove in the valve stem and maintaining the spring retainer in position on the valve stem with one end of the compression spring abutting the engine block and the other end of the compression spring abutting the spring retainer, and an oil sealing ring mounted in an annular groove in the valve stem near the segmental keeper groove and sealingly engaging the spring retainer.

The tool comprises an elongated body having a free end and a working end. An axial bore extends inwardly of the working end and is of such diameter as to just nicely receive the free end of the valve stem. The working end of the tool provides a working surface surrounding the axial bore. During the valve mounting operation, this working surface abuts the segmental keeper when the free end of the valve stem is located within the axial bore.

When an axial blow is administered to the tool from the direction of its free end, contact between the segmental keeper and tool working surface will cause the segmental keeper to shift along the valve stem, shifting the spring retainer as well, until the segmental keeper is engaged in its annular valve stem groove. The depth of the axial bore in the tool is such that the free end of the valve stem will abut the bottom of the bore preventing the tool from shifting the segmental keeper beyond its annular valve stem groove, regardless of the magnitude of the blow administered to the tool, and thus preventing damage to or destruction of the oil sealing ring by the segmental keeper.

The tool of the present invention may constitute an accessory part of the combination tool of the above mentioned U.S. Pat. No. 3,315,339, adapted to cooperate with the valve demounting part of that tool. In the alternative, the tool of the present invention may constitute a separate tool, provided with its own handle means.

BRIEF DESCRIPTION OF THE DRAWINGS

FIG. 1 is a fragmentary cross-sectional view of an engine block and a valve assembly mounted therein.

FIG. 2 is a fragmentary elevational view, partly in cross-section, illustrating the valve demounting part and the valve mounting part of the combination tool of U.S. Pat. No. 3,315,339.

DETAILED DESCRIPTION OF THE INVENTION

Figure 3:
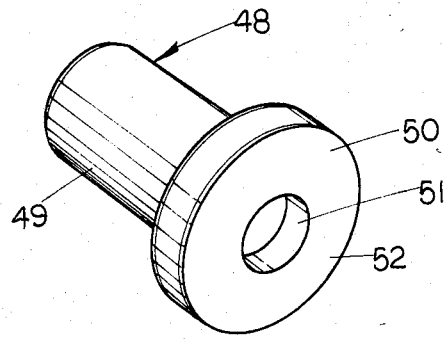
FIG. 3 is a perspective view of the tool of the present invention.

Turning first to FIG. 1, a portion of a conventional overhead valve engine block is shown at 1. One of the ports of engine block 1 is shown at 2 and is defined by a valve seat 3. The engine block is also provided with a bore 4 coaxial with port 2. At the exterior of engine block 1, the bore 4 is surrounded by an annular boss 5.

FIG. 1 illustrates a conventional valve assembly. The valve assembly comprises a valve member 6. The valve member 6 comprises an elongated valve stem 7, terminating exteriorly of engine block 1 in a free end 8 and interiorly of the engine block in a valve head 9, adapted to cooperate with valve seat 3. The valve stem 7 extends through engine block bore 4 with a sliding fit so that the valve member 6 is reciprocably mounted in engine block 1.

The valve member 6 is normally urged to its closed position shown in FIG. 1 (i.e. with valve head 9 abutting valve seat 3), by a strong compression spring 10. The compression spring 10 surrounds valve stem 7. At one end, the compression spring 10 abuts the exterior surface of engine block 1, about boss 5 which serves as a spring guide. The other end of compression spring 10 abuts a spring retainer 11. The spring retainer 11 is operatively affixed to the valve stem 7 near its free end 8, as will next be described.

Spring retainer 11 comprises a body portion 12 having a central bore 13 which tapers inwardly and toward engine block 1. The spring retainer is intended to surround valve stem 7 and that end of spring retainer 11, nearest the free end 8 of valve stem 7, is provided with an annular flange 14, the under surface 15 of which is intended to be abutted by the adjacent end of compression spring 10. The spring retainer is maintained in place on valve stem 7 by a segmental keeper 16 comprising two substantially identical halves 16a and 16b. Keeper half 16a has a semi-cylindrical interior surface 17 of a diameter closely approximating the outside diameter of valve stem 7. The inside surface 17 is provided with a flange 18 adapted to be received within an annular knotch 19 in valve stem 7 near its free end 8. The exterior surface 20 of keeper segment 16a is tapered and substantially corresponds to the inside tapered surface 13 of spring retainer 11. As indicated above, keeper segment 16b is substantially identical to keeper segment 16a, having a semi-cylindrical interior surface 21, an interior flange 22 adapted to be received within valve stem groove 19 and a tapered exterior surface 23 corresponding to the tapered interior surface 13 of spring keeper 11. It will be evident from FIG. 1 that when the segmental keeper 16 is in the position shown, it will prevent the keeper from shifting toward the free end 8 of valve stem 7 by virtue of the wedging action between the exterior tapered surfaces 20 and 22 of keeper segments 16a and 16b and the tapered interior surface 13 of the spring retainer. This wedging action is maintained by the abutment of compression spring 10 against the under side of spring retainer flange 14. Many valve stem assembly embodiments are provided with a second annular groove 24 in the valve stem 7, adapted to retain an oil seal ring 25. The oil seal ring 25 abuts and forms a seal with the inner tapered surface 13 of spring retainer 11.

Finally, some embodiments of valve assemblies include a cylindrical cup-like member 26, having in-turned flange 27. The cup-like member 26 is placed over that end of compression spring adjacent spring retainer 11, with its in-turned annular flange 27 located beneath the spring retainer flange 14. When the cup-like member 26 is present, the adjacent end of compression spring 10 abuts the in-turned annular flange 27 thereof, which in turn abuts the under side of spring retainer flange 14.

Reference is now made to FIG. 2 wherein the combination tool of U.S. Pat. No. 3,315,339 is illustrated. The combination tool comprises a valve demounting part 28 and a valve mounting part 29.

Valve demounting part 28 comprises an elongated cylindrical, rigid, metal body having a slightly rounded impact end 30 and a flat working end 31. An axial bore 32 extends inwardly of the working end 31. The axial bore has a first portion 32a and a second portion 32b of lesser diameter. A shoulder 33 is formed between bore portions 32a and 32b. Mounted within bore portion 32a and against shoulder 33 there is a cylindrical permanent magnet 34, having a bore 35 therethrough of a diameter substantially the same as the diameter of bore portion 32b.

To describe the operation of the valve demounting tool part 28, reference is made to both FIGS. 1 and 2. The valve member is fixedly supported against axial movement. The tool part 28 is manually held above the valve assembly, substantially coaxial with the valve stem. That edge of magnet 35, which is substantially coplanar with the working end 31 of tool part 28, is placed in contact with the flange 14 of spring retainer 11. An axial blow (by hand or through the use of an appropriate tool) is applied to the rounded impact end 30 of tool part 28. The blow causes retainer 11 to shift downwardly as viewed in FIG. 1, against the action of compression spring 10, thus releasing the wedging action between the spring retainer 11 and the segmental keeper 16. With the spring retainer shifted downwardly, the keeper segments 16a and 16b are disengaged from the valve stem groove 19 and are removed from the assembly through the attraction thereof by magnet 35. Upon removal of the tool part 28 from the valve assembly, the keeper segments 16a and 16b can be manually removed from magnet 35. At this point, the spring retainer 11, the cup-like member 26 (if present), and the compression spring can be removed from about valve stem 7 and the oil sealing ring 25 can be removed and replaced, if required.

The valve mounting tool part 29 (FIG. 2) comprises a first hollow cylindrical member 36 having a working end provided with an in-turned annular flange 37, and a second hollow cylindrical member 38. As viewed in FIG. 2, the lower end of cylindrical member 38 is telescoped within the upper end of cylindrical member 36 and is permanently affixed therein by welding, brasing or the like.

An annular collar 39 is located within cylindrical member 36 and has an outside diameter substantially equal to the inside diameter of cylindrical member 36, so as to be slidable therein. The collar 39 is normally urged downwardly against the annular flange 37 by a compression spring 40. One end of compression spring 40 abuts the annular collar 39, while the other end of compression spring 40 abuts the adjacent end of cylindrical member 38.

Annular collar 39 has an axial bore 41. A plunger 42 is provided having a tapered nose portion 42a, a portion 42b having an outside diameter substantially equal to the diameter of collar bore 41 so as to be slidably mounted therein and a head portion 42c of larger diameter.

Cylindrical member 38 has a first axial bore 43 and a second axial bore 44 of slightly larger diameter, providing a shoulder 45 therebetween. A plunger 46 is mounted in bores 43 and 44. The portion 46a of plunger 46 within bore 43 has an outside diameter substantially equal to the diameter of bore 43. The plunger also has a head portion 46b located within bore 44 and of a diameter substantially equivalent to the diameter of bore 44.

The enlarged or head portion 42c of plunger 42 is urged against collar 39 and the enlarged or head portion 46d of plunger 46 is urged against shoulder 45 by a compression spring 47 which extends between the two plungers. The plunger 46 may be used to easily and quickly locate a new oil seal ring 25 on stem 7, as is clearly taught in U.S. Pat. No. 3,315,339.

The tool part 29 is used in conjunction with tool part 28 to mount a valve assembly, such as is shown in FIG. 1. This is accomplished in the following manner. The cylindrical member 38 is inserted in magnet bore 35 and axial bore portion 32b of tool part 28. When this is done, the magnet 34 abuts the adjacent end of cylindrical member 36, firmly holding tool part 29 within tool part 28.

To mount the valve assembly illustrated in FIG. 1, the oil seal 25 is located in valve stem groove 24. Compression spring 10 is then placed about the valve stem 7 and boss 5. If used, the cup-like member 26 is mounted on the free end of compression spring 10. Thereafter, the spring retainer 11 is located about valve stem 7 and on the free end of compression spring 10 (or on cup-like member 26, if present). Finally, keeper segments 16a and 16b are loosely located in place about valve stem 7 and within spring retainer 11. The valve member 6 is fixedly supported against axial movement.

The combination tool, including parts 28 and 29, is held manually above the valve assembly, in axial alignment therewith. The nose 42a of pin 42 is caused to contact the free end 8 of valve stem 7. The combination tool is shifted axially toward the valve assembly and plunger 41 yields against the action of light compression spring 47 until the upper edges of keeper segments 16a and 16b are abutted by collar 39 of the combination tool. Simultaneously, the annular flange 37 of valve mounting part 29 contacts or lies very close to the upper surface of spring keeper flange 14.

At this point, a brisk, axial blow is imparted to the impact end 30 of the combination tool. The annular flange 37 of tool part 29 contacts the upper surface of spring retainer flange 14 and shifts the spring retainer 11 inwardly along valve stem 7, against the action of compression spring 10. This provides clearance for the tool collar 39 to shove the keeper segments 16a and 16b downwardly until their internal ribs 18 and 22 engage and lock in the annular valve stem groove 19. In this way, the mounting of the valve assembly is completed.

A problem arises from the fact that if the axial blow imparted to the combination tool is too great, the collar 39 can shove the keeper segments 16a and 16b beyond valve stem groove 19 and into contact with the oil seal ring 25, cutting, damaging or destroying the oil seal ring 25. The tool of the present invention will preclude this from happening.

Figure 4:
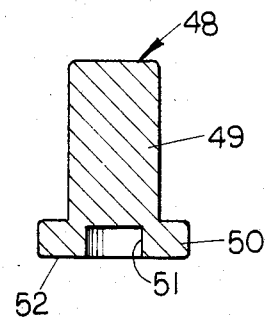
FIG. 4 is a cross-sectional elevational view of the tool of the present invention.

The tool of the present invention is generally indicated at 48 in FIGS. 3 and 4. As indicated above, the tool is illustrated in its application as an accessory part for the combination tool of FIG. 2. In this embodiment, the tool comprises a cylindrical shank portion 49 terminating at one end in an enlarged cylindrical portion 50. An axial bore 51 extends from the enlarged end 50. The bore 51 has a diameter approximating the outside diameter of valve stem 7, so that the free end 8 of valve stem 7 can be just nicely received therein. The enlarged portion 50 provides an annular work surface 52 surrounding bore 51.

The tool shank 49 has an outside diameter such that it is just nicely received in the central bore 35 of the magnet 34 of tool part 28 and into bore portion 32b thereof. The magnet 34 abuts the enlarged end portion 50 of the tool, holding the tool in place in tool part 28, as is shown in FIG. 5.

Figure 5:
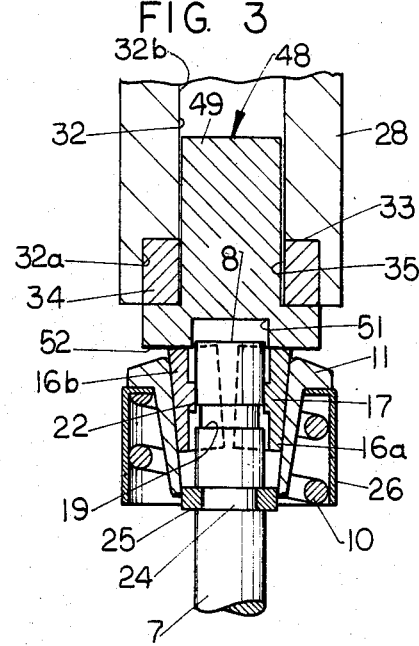
FIG. 5 is a fragmentary elevational view, partly in cross-section, illustrating the spring retainer, the segmental keeper and the tool of the present invention located on and in association with the valve stem prior to final mounting.

Reference is now made to FIG. 5. As described above, in the valve mounting operation, the valve stem 7 is fixed against axial movement. The oil seal ring 25 is located in the valve stem groove 24. The compression spring 10 is located about valve stem 7 and the cup-like member (if present) is mounted atop the compression spring 10. Then, the spring retainer 11 is located about the valve stem 7 near the free end 8 thereof and the keeper segments 16a and 16b are loosely located in place between the valve stem 7 and the spring retainer 11, as shown in FIG. 5.

When this subassembly has been made, the tool 49 (mounted in tool part 28) is manually held above the valve assembly, in axial alignment therewith. The free end 8 of the valve stem just begins to enter the bore 51 of accessory tool 48. The working surface 52 of the accessory tool contacts the upper edges of keeper segments 16a and 16b.

Figure 6:
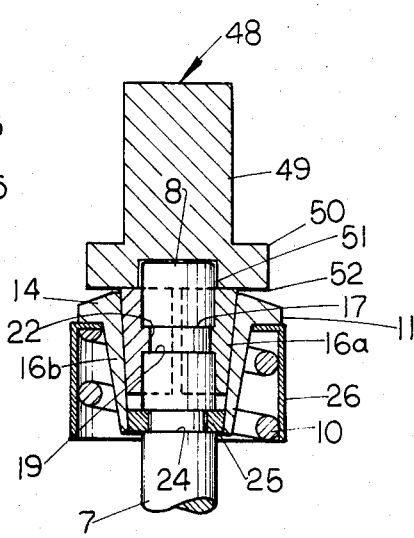
FIG. 6 is a fragmentary elevational view, partly in cross-section, similar to FIG. 5 and illustrating the parts in their fully mounted positions.

At this point, an axial blow is imparted to the rounded impact end 30 of tool part 28. This action causes keeper segments 16a and 16b and the retainer 11 to shift inwardly along valve stem 7 until the keeper segment lugs 18 and 22 engage in stem groove 19, locking the spring retainer 11 in place and completing the valve assembly mounting operation. It will be evident from FIG. 6, wherein the mounting operation has been completed, that the keeper segments 16a and 16b cannot be driven too far inwardly along valve stem 7 so as to damage oil seal ring 25, by virtue of the abutment of the free end 8 of valve stem 7 against the bottom of accessory tool bore 51. The tool bore 51 is of such depth that abutment thereof by the free end 8 of valve stem 7 will not occur until keeper segment lugs 18 and 22 seat within valve stem groove 19, but will occur before the keeper segment lugs 18 and 22 could be driven beyond groove 19. Thus, even if the axial blow imparted to tool part 28 is overly severe, the oil seal ring 25 will remain undamaged and intact and the keeper segments 16a and 16b will have their lugs 18 and 22 properly seated in valve stem groove 19.

Modifications may be made in the invention without departing from the spirit of it. For example, the tool 48 can constitute a separate, independent tool. It is only necessary to provide the tool with an appropriate handle element, or simply to increase the length of the shank portion 49 so that it will constitute an appropriate handle portion which can readily be grasped manually and to which an axial blow can be imparted from the user's hand or an appropriate tool. Under these circumstances, the shank portion 49 and the enlarged portion 50 could be of the same diameter, and both portions could have a cross-sectional configuration other than circular.

What is claimed is:

1. A combination tool and valve, said valve having an elongated stem with a free end, first and second grooves about said valve stem near said free end; said tool designed to mount said valve in an internal combustion engine block including an annular spring retainer extending about said valve stem near the free end thereof with a body portion having a tapered interior surface surrounding said valve stem and an annular flange; a compression spring surrounding said valve stem and abutting said engine block and said spring retainer flange; a segmental keeper, the segments of which are located within said spring retainer body portion, each of said keeper segments having a tapered exterior surface engaging said tapered interior surface of said spring retainer with a wedging action and an interior surface with a lug designed to be engaged in said first groove in said valve stem portion near said free end thereof; and an oil seal ring designed to be located in a second groove in said valve stem spaced a greater distance from said stem free end and said first groove, said oil seal ring sealingly engaging said spring retainer; said tool comprising a solid body having a shank portion and an enlarged portion of greater cross-sectional dimension than said shank portion with a shoulder formed therebetween, said enlarged portion terminating in a working end having an axial bore formed therein of such diameter so as to just nicely receive said free end of said valve stem portion and a working surface surrounding said axial bore, elongated handle means for said tool enabling manual positioning of said tool in axial alignment with said valve stem portion with said free end of said valve stem portion in said axial bore of said tool and said tool working surface abutting said tool segments during mounting of said valve assembly, said handle having a forward end with an axial bore sized to just nicely receive said tool shank portion and a forward surface surrounding said handle bore and in abutment with said tool shoulder, means to releasably maintain said tool shank in said handle bore free of relative axial motion therebetween, said handle having a rearward impact end to which an axial blow can be imparted to cause said working surface of said tool to drive said keeper segments along said stem portion until said lugs engage in said first groove, said axial tool bore terminating in a closed end within said enlarged portion of said solid body, said tool bore being of such depth that abutment of its closed end by said valve stem portion free end will preclude driving of said keeper segments beyond the point where said segment lugs engage said first groove, whereby to prevent damage to said oil seal ring by said keeper segments.

2. The structure claimed in claim 1 wherein said tool shank portion and enlarged portion are both cylindrical.

3. The structure claimed in claim 1 wherein said tool is of metallic construction, said handle bore having a first portion of enlarged cross-sectional configuration followed by a second portion of a cross-sectional configuration to just nicely receive said tool shank portion, said means to releasably retain said tool shank in said handle bore comprising a permanent magnet mounted in said first portion and having a central bore of a cross-sectional configuration substantially identical to that of said handle bore second portion, said tool shank extending through said magnet bore and into said handle bore second portion.

4. The structure claimed in claim 3 wherein said tool shank and enlarged portions are cylindrical and wherein said handle bore first and second portions and said magnet bore are of circular cross-section, said magnet comprising an annular member.

5. The structure claimed in claim 4 wherein said annular magnet is so sized as to overlie and abut said spring retainer flange when said handle element alone is manually held in axial alignment with said valve stem portion, whereby an axial blow administered to said impact end of said handle element will cause said handle element to shift said spring retainer along said valve stem portion releasing said keeper segment lugs from said first groove and causing said keeper segments to be attracted to said magnet.

* * * * *